Sept. 11, 1928.   S. P. WIEGNER ET AL   1,683,852
SIGNAL SWITCH FOR VEHICLES
Filed Aug. 23, 1924

Inventors.
Simon Peter Wiegner,
Claude W. Davidson and
Henry R. Gordon.
by James R. Townsend
their atty.

Witness:
W. M. Gentle.

Patented Sept. 11, 1928.

1,683,852

UNITED STATES PATENT OFFICE.

SIMON PETER WIEGNER, CLAUDE W. DAVIDSON, AND HENRY R. GORDON, OF LOS ANGELES, CALIFORNIA.

SIGNAL SWITCH FOR VEHICLES.

Application filed August 23, 1924. Serial No. 733,808.

An object of this invention is to provide a signal for vehicles that can be mounted on the exterior of an automobile in position to be visible to persons in traffic, with means on the interior of the vehicle and connected to the brake pedal and steering post for operating the signal. In other words, I provide an exterior signal with interior operating means that is especially adapted for use of enclosed cars.

An object is to provide a signal that can be actuated without a car driver releasing the steering wheel or removing a foot from the brake pedal. To that end, I provide revolvable hand switches on the steering wheel for actuating the signals indicating right and left hand turns; and a switch on the brake pedal that when closed as the brake is actuated to retard or stop the car actuates the stop signal.

An object of the invention is to provide a signal with means in connection therewith for moving and holding the signal arms in their proper position to accord with the signal positions established by custom. That is, the stop signal arms is arranged so that when actuated it is moved out and pointed downwardly at an angle of 45 degrees to a line vertical through the arm pivot. The right turn signal arm is moved out at a right angle to a line vertical through the pivot; and the left turn signal arm is moved outward and upward 135 degrees. In other words the arms are moved to positions now generally adopted in signalling; so that persons unable to distinguish the writing on the signal arms can readily tell by their positions the intentions of a car driver.

Another object is to provide a signal for vehicles that is pleasing in appearance, and that is simple to construct, install and operate.

Features of the invention are shown in the construction, combination and arrangement of parts whereby an efficient signal appliance for closed cars is provided.

Other objects, advantages and features of invention may appear from the accompanying drawing, the subjoined detail description and the appended claims.

The accompanying drawing illustrates the invention.

Figure 1:
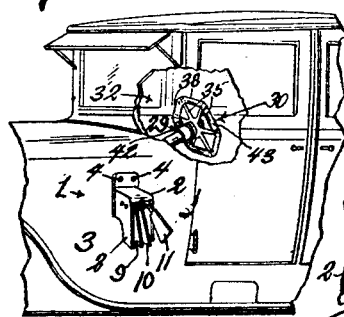
Figure 1 is a fragmental view of a vehicle body with a signal appliance installed that is constructed in accordance with this invention.
Figure 2:
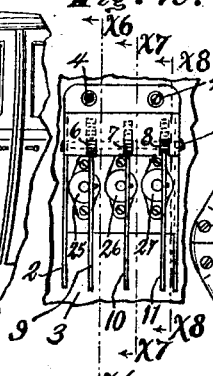
Fig. 2 is an enlarged fragmental side view of the signal appliance, showing it detached from the switches and battery, and the signal arms in normal position.

The signal 1 comprises a casing 2 that is adapted to be attached to a car 3 in position so it is visible to persons in traffic and also to the driver of the car; and it can be secured in place by any well known means as by the screws 4.

A shaft 5 is fixed in the casing 2, and on this shaft are loosely mounted the spaced pinions 6, 7, 8 to which are secured the respective signal arms 9, 10, 11, that normally hang down parallel with a line vertical through the shaft 5.

Parallel to shaft 5 is arranged a countershaft 12 on which the spaced gear segments 13, 14, 15 are loosely mounted and arranged with their teeth engaging their respective pinions.

Figures 9, 10:
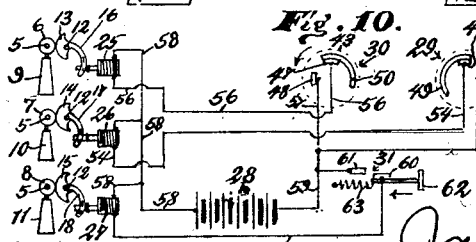
Fig. 9 is an enlarged fragmental section on line $x^9$, Fig. 8.
Fig. 10 is a diagrammatic view of the signal showing the wiring connection to the switches and battery.

The segments are provided with slotted curved cranks 16, 17, 18 adapted to be fitted over pins 19, 20, 21 in the respective cores 22, 23, 24 that are adapted to be actuated by the respective relay magnets 25, 26, 27 that are secured in the casing 2; and these magnets are in circuit with a battery 28, and switches 29, 30 and 31 by wiring as shown in Fig. 10.

The cores are provided with adjustable collars 22', 23', 24', for limiting their movement toward the relay magnets, and by adjusting these collars the cores can be moved the right distance by the magnets to actuate the signal arms to a proper position.

The switches 29, 30 are preferably connected to an automobile steering wheel 32 as shown in the drawing.

The wheel 32 comprises a metal spider having a hub 33 adapted to be secured to the post 34; and integral with the hub 33 are the radial arms 35 that are spaced equidistant apart and provided with web hands 36 having screw holes 37.

Wooden cylindrical segments 38 have their ends mortised, fitted to, and secured to the hands 36 by screws 39 by which construction and arrangement of parts a hexagon rim steering wheel 32 is provided; and on two of the oppositely arranged segments 38 are mounted the rotary hand switches 29, 30 that are adapted to be turned on their axis to make and break the circuits controlling the right and left hand turning signals.

The switches 29, 30 are constructed substantially alike, except that they rotate oppositely to one another in making and breaking the circuits. That is the right turn switch 29 is rotated toward the right, and the left hand switch 30 is rotated toward the left to close their circuits as indicated by arrows in Figs. 4, 10.

The switch carrying segments 38 are preferably formed of two parts 40, 41 that are reduced in diameter to provide a seat for the cylindrical insulation hand grips 42, 43; and also to provide recesses 44 in which the respective contacts 45, 46 and 47, 48 are mounted in position to be engaged by the respective rotary segments 49, 50, that are carried by the hand grips. Contacts 45, 46 and 47, 48 are provided with spring blade contact members 48', which extend slightly forwardly of the contact post 48" and into the path of the rotative segments 49, 50, so that when the hand grips are turned to bring the rotative segments 49, 50 into contact with the members 48', the circuit is closed between said parts. The part 41 extends into the part 40 to support the end thereof, which is cut to provide the recess 44.

Figures 3, 4, 5:
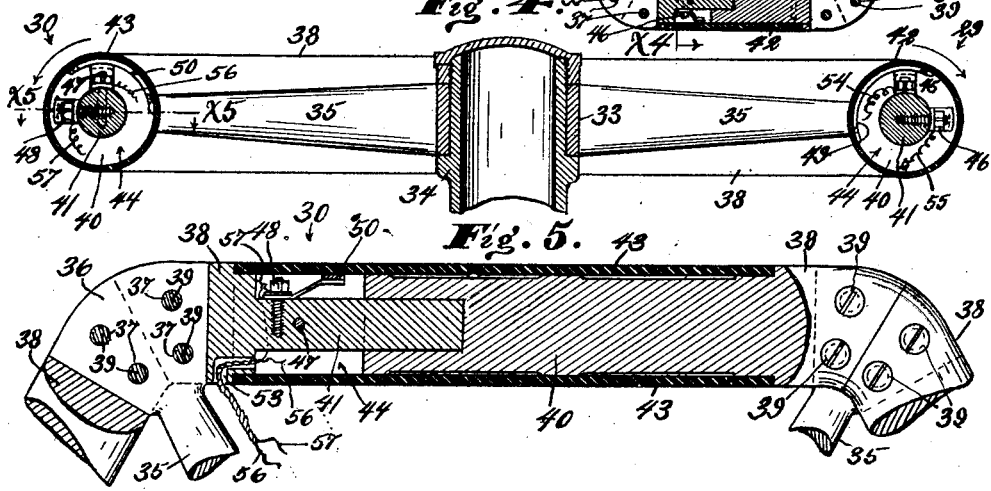
Fig. 3 is an enlarged plan view of the steering wheel with the right turn hand switch in section.
Fig. 4 is an enlarged fragmental section on staggered line $x^4$, Fig. 3, showing sections through both the right and left hand switches with their terminals out of contact.
Fig. 5 is a fragmental section on line $x^5$, Fig. 4, showing the left hand switch with its terminals in contact.

The hand grips 42, 43 can be slotted as at 51 in Fig. 3, and provided with stop pins 52 to limit the rotation of the grips so that when one end of a slot 51 engages a pin 52 the switches will be open and when engaging the other end of the slot they will be closed.

Openings 53 are provided in the parts 41 through which the respective lead wires 54, 55 and 56, 57 are extended from their respective contacts, see Figs. 3, 4.

Figures 6, 7, 8:
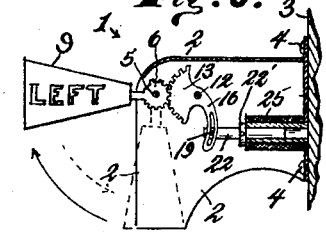
Fig. 6 is a fragmental section in line $x^6$, Fig. 2, showing the left hand turn signal moved from normal to actuated position to indicate a driver's intention to make a left hand turn.
Fig. 7 is a fragmental section on line $x^7$, Fig. 2, showing the right hand turn signal moved from normal to actuated position to indicate a driver's intention to make a right hand turn.
Fig. 8 is a fragmental section on line $x^8$, Fig. 2, showing the stop signal moved from normal to actuated position to indicate a driver's intention to slow down or stop the car.

The complete circuit of the switch 29 comprises the contact 45, wire 54, relay magnet 26, battery wire 58, battery 28, lead wire 59 and contact 46; and the circuit is opened and closed by movement of the segment 49 on the hand grip 42, and when the switch is closed the right turn signal will be actuated in the direction of the full line arrows in Fig. 7; and when the switch 29 is open the arm 10 will fall by gravity in the direction of the dotted arrows to a position invisible in the casing 2.

The complete circuit of the switch 30 comprises the contact 47, wire 56, relay magnet 25, battery wire 58, battery 28, return wire 59 and contact 48; and the circuit is opened and closed by movement of the segment 50 on the hand grip 43, and when the switch is closed the left hand turn signal will be actuated in the direction of the full line arrow shown in Fig. 6; and when the switch 30 is open signal will fall by gravity in the direction of the dotted arrow.

The switch 31 is provided with the contacts 60, 61 that are opened and closed by the foot pedal 62 diagrammatically illustrated in Fig. 10. The pedal is pushed against the tension of the spring 63 to engage the contacts and the spring automatically disengages them.

The complete circuit of the switch 31 comprises the contact 60, wire 64, relay magnet 27, battery wire 58, battery 28, return wire 59 and contact 61, and when this switch is closed the stop signal will be actuated in the direction of the full line arrow; and when the switch is open the signal will fall by gravity as indicated by the dotted arrow in Fig. 8.

In operation the car driver when intending to make a right hand turn rotates the hand grip 42 on its axis toward the right as indicated by the right hand arrow in Fig. 4 to close the switch 29, so that the relay magnet 26 will actuate the right hand turn signal; and also simultaneously with the actuation of the right turn signal the pedal can be moved to close its switch 31 and actuate the stop signal; and the signals are arranged so that when actuated both are visible to persons in the traffic.

The left turn signal is actuated by rotating the hand grip 43 toward the left as indicated by the left hand arrow in Fig. 4; and also it and the stop signal can be operated in unison and both are visible when in actuated position.

We claim:
1. A vehicle steering wheel having a rim comprising a plurality of segments, one of said segments formed in two parts, one restricted segmental part being received within a bore in the other of said parts and forming therewith a cavity; a cylindrical insulated hand grip mounted on said rim segments; a contact element on said restricted segment part; a contact ring on said hand grip adapted to engage the first mentioned contact upon rotation of said hand grip and means carried by the bored segmental part and adapted for engagement with the hand grip to limit the rotation of the said grip.

2. A vehicle steering wheel having a rim comprising a plurality of segments, each segment being formed in two parts, one of said parts provided with a bore, the other of said parts having a reduced portion adapted to be received within said bore; a cylindrical insulated grip member mounted on said rim segmental parts and forming a recess between said reduced portion and said grip member; a spring contact element connected to said reduced portion, a concentric contact element on said grip member, adapted to engage said spring contact element when said grip is rotated, said grip member formed with a slot and a stop pin carried by the bored segmental part and having its free end projecting through said slot and adapted to limit the rotation of said hand grip.

In testimony whereof, we have hereunto set our hands.

Said WIEGNER at Los Angeles, California, this 22nd day of May, 1924.

SIMON PETER WIEGNER.

Said GORDON at Mullen, Nebr., 9 June, 1924.

HENRY R. GORDON.

Said DAVIDSON at St. John, Utah this 23rd day of June, 1924.

CLAUDE W. DAVIDSON.